US008664904B2

(12) United States Patent
Suzuki

(10) Patent No.: US 8,664,904 B2
(45) Date of Patent: Mar. 4, 2014

(54) MOTOR DRIVE APPARATUS AND ELECTRIC POWER STEERING SYSTEM USING THE SAME

(75) Inventor: Haruo Suzuki, Kariya (JP)

(73) Assignee: Denso Corporation, Kariya (JP)

( * ) Notice: Subject to any disclaimer, the term of this patent is extended or adjusted under 35 U.S.C. 154(b) by 154 days.

(21) Appl. No.: 13/308,834

(22) Filed: Dec. 1, 2011

(65) Prior Publication Data

US 2012/0145473 A1    Jun. 14, 2012

(30) Foreign Application Priority Data

Dec. 8, 2010   (JP) ................................. 2010-273419

(51) Int. Cl.
*H02P 27/00*    (2006.01)

(52) U.S. Cl.
USPC ....................................................... 318/400.3

(58) Field of Classification Search
USPC ................................................. 180/443, 444
See application file for complete search history.

(56) References Cited

U.S. PATENT DOCUMENTS

| 7,116,087 | B2* | 10/2006 | Zhang et al. ................. | 323/272 |
| 7,268,611 | B2 | 9/2007 | Kikuchi et al. | |
| 7,583,069 | B2* | 9/2009 | Suzuki .......................... | 323/285 |
| 7,596,441 | B2* | 9/2009 | Yokota et al. .................. | 701/41 |
| 2006/0044852 | A1 | 3/2006 | Suzuki | |
| 2006/0097663 | A1* | 5/2006 | Johnsen et al. .............. | 315/308 |
| 2008/0066995 | A1* | 3/2008 | Yabuguchi et al. .......... | 180/446 |
| 2012/0256561 | A1* | 10/2012 | Kwon .......................... | 315/307 |

FOREIGN PATENT DOCUMENTS

| JP | 03-207262 | 9/1991 |
| JP | 11-69790 | 3/1999 |
| JP | 2004-260887 | 9/2004 |
| JP | 2005-224011 | 8/2005 |
| JP | 2006-62515 | 3/2006 |
| JP | 2008-245348 | 10/2008 |
| JP | 2009-163948 | 7/2009 |
| JP | 2009-213229 | 9/2009 |
| JP | 2009-213239 | 9/2009 |
| JP | 2009-266425 | 11/2009 |
| WO | WO 2004/025730 | 3/2004 |

OTHER PUBLICATIONS

Office Action issued Jan. 8, 2013 in corresponding Japanese Application No. 2010-273419 with English translation.
Office Action mailed Aug. 8, 2013 in the corresponding JP application No. 2010-273419 with English translation thereof.

* cited by examiner

*Primary Examiner* — Tony Winner
(74) *Attorney, Agent, or Firm* — Harness, Dickey & Pierce, PLC

(57) ABSTRACT

A booster circuit of a motor drive apparatus has at least two sub-booster circuits connected in series. Each sub-booster circuit includes a booster coil, a boosting switching element, a reducing switching element and an output capacitor, and outputs, by boosting an input voltage, a boosted output voltage. The booster circuit 20 outputs from its final stage sub-booster circuit a booster output voltage, a total boosting ratio of which is a product of sub-boosting ratios of the series-connected sub-booster circuits. Thus, the booster output voltage supplied to a motor drive circuit is prevented from falling even when high power output is required.

4 Claims, 5 Drawing Sheets

MOTOR DRIVE APPARATUS AND ELECTRIC POWER STEERING SYSTEM USING THE SAME

CROSS REFERENCE TO RELATED APPLICATION

This application is based on and incorporates herein by reference Japanese patent application No. 2010-273419 filed on Dec. 8, 2010.

FIELD OF THE INVENTION

The present invention relates to a motor drive apparatus including a voltage booster circuit, which outputs a booster output voltage, and an electric power steering system using the motor drive apparatus.

BACKGROUND OF THE INVENTION

A voltage booster device includes a voltage booster circuit, which outputs a booster output voltage. The booster output voltage outputted by the booster circuit, is used in an inverter circuit for driving an AC motor, for example. By using the booster circuit, influence of resistance of a wire between an inverter and a motor and influence of variation in a battery voltage are reduced. In case of using the booster circuit in the electric power steering system, stability of steering operation is enhanced.

Patent document 1 (JP 4483322) and patent document 2 (JP 2006-62515A, US 2006/0044852A1) disclose exemplary voltage booster devices, which are used in an electric power steering system. A chopping-type voltage booster circuit used in the exemplary voltage booster device performs a voltage boosting operation by turning on and off switching elements at high speeds. The voltage booster circuit controls a booster output voltage by regulating a voltage boosting duty, which is a ratio of the on-period of the voltage boosting switching element relative to a one-cycle period of the switching operation. The voltage booster device according to patent document 1 reduces the output voltage of the booster circuit to suppress heat generation of the booster circuit when the booster output voltage exceeds an upper limit voltage. The booster device according to patent document 2 corrects a target voltage to suppress overshooting of the output voltage.

According to the booster devices disclosed in patent documents 1 and 2, the booster output voltage falls and the target voltage cannot be provided when high output power exceeding a power corresponding to a saturation duty, which is an upper limit value of a boosting duty. In case that this booster circuit is used in an electric power steering system, assist torque required for rapid steering operation time cannot be provided and steering operation feeling is worsened. In case of an electric power steering system, which is used for a large-sized vehicle, it is required to be able to output high power.

One exemplary conventional motor drive apparatus is shown in FIG. 6. As shown in FIG. 7, a booster circuit 70 of a motor drive apparatus 7 includes a booster coil 71, a boosting switching element 72, a reducing switching element 73 and an output capacitor 74. The booster circuit 70 performs voltage boosting operation by turning on and off the switching elements 72, 73 at high speeds. Thus, the booster circuit 70 is formed as a chopping-type booster circuit.

The booster coil 71 induces voltage in response to charge and discharge of energy. The boosting switching element 72 and the reducing switching element 73 are formed of, for example, MOS field-effect transistors, and turned on and off by electric signals supplied from a CPU 21. The boosting switching element 72 is connected between an output terminal of the booster coil 71 and the ground. The reducing switching element 73 is connected between the output terminal of the booster coil 71 and the motor driver circuit 25. The output capacitor 74 is connected between an output terminal of the booster coil 73 and the ground to smooth a booster output voltage Vout. With the above-described configuration, the booster circuit 70 boosts the battery voltage Vin of the battery 22 and outputs the booster output voltage Vout to the motor drive circuit 25.

In operation, the boosting switching element 72 and the reducing switching element 73 in the booster circuit 70 are controlled to turn on and off alternately in accordance with on/off control signals from the CPU 21. That is, one of the switching elements 72, 73 is turned on when the other of the switching elements 72, 73 is turned off. This is for the purpose of protecting switching elements 72, 73 from being broken due to excessive current, which flows when both the boosting switching element 72 and the reducing switching element 73 are turned on at the same time. Since the switching elements 72, 73 are both turned on for a short time at the same time because of short time delay in on/off switching-over time, a dead time is provided so that both switching elements 72, 73 are turned off. No dead time is assumed here.

When the boosting switching element 72 is switched over from the on-state to the off-state, current flows from the battery 22 to the booster coil 71. The magnetic field generated by the booster coil 71 changes in correspondence to changes in the current and induces voltage, and energy is charge in the booster coil 71. When the boosting switching element 72 is switched back to the off-state and the reducing switching element 73 is switched over to the on-state, the induced voltage of the booster coil 71 is superimposed on the battery voltage Vin. The booster coil 71 thus charges the output capacitor 74 while discharging its charged energy. The booster output voltage Vout is thus raised by the repetition of the switching operation.

The CPU 21 receives the booster output voltage Vout, which is fed back, and controls the duty of the switching operation so that the booster output voltage Vout attains a target output voltage Va of the booster circuit 70. The duty is a ratio of the on-time of the switching element in a one-cycle time of the switching operation and expressed in units of %. The duty of the boosting switching element 72 is referred to as a boosting duty D1, and the ratio of on-time of the reducing switching element 73 is referred to as a reducing duty D2. The CPU 21 increases the boosting duty D1 to promote a voltage boosting operation when the booster output voltage Vout is lower than the target output voltage Va. The CPU 21 reduces the boosting duty D1 to suppress the voltage boosting operation when the booster output voltage Vout approaches the target output voltage Va.

The relation among the boosting duty D1, the reducing duty D2, and the boosting ratio α, which indicates a ratio of the booster output voltage Vout relative to the battery voltage Vin and are expressed by equations (1-1) and (1-2).

$$Vout = Vin \times \alpha \qquad (1\text{-}1)$$

$$\alpha = (D1 + D2)/(100 - D1) \qquad (1\text{-}2)$$

The following equation (1-3) holds, if dead-time is ignored. The equation (1-2) is expressed as equation (1-4).

$$D1+D2=100 \quad (1\text{-}3)$$

$$\alpha=(D1+D2)/D2 \quad (1\text{-}4)$$

For example, α=2 holds if D1=D2=50%.

In this case, the booster output voltage Vout becomes two times as large as the battery voltage Vin.

The conventional booster circuit 70 thus exhibits an output voltage characteristic and a duty characteristic as shown in FIG. 7. In FIG. 7, the abscissa axis indicates an inverter output, that is output (unit: W) supplied to the motor drive circuit 25 and the ordinate axis indicates voltages (unit: V) and duties (unit: %). The voltages include the battery voltage Vin, the booster output voltage Vout and the target output voltage Va. The duties include the boosting duty D1, the reducing duty D2 and a saturation duty Dmax.

It is assumed in the conventional booster circuit 70 that the inverter output is Q1, the boosting duty D1 is about 70% and the reducing duty D2 is about 30%. With this assumption, the boosting ratio α is about 3.3 from the equation (1-4). Therefore, the booster output voltage Vout becomes about 33V relative to the battery voltage Vin of about 10V. Assuming that the target output voltage Va is fixed at, about 33V, the CPU 21 increases the boosting duty D1 in accordance with an increase in the required inverter output so that the booster output voltage Vout attains the target output voltage Va. As the boosting duty D1 increases, the reducing duty D2 decreases. However, the boosting duty D1 is limited at its upper limit, which is the saturation duty Dmax provided to protect the boosting switching element 72 from breaking down. In this example, the saturation duty Dmax is set to about 80%. The boosting duty D1 therefore becomes a fixed value over a limit output Qc of the inverter. As a result, the booster output voltage Vout falls below the target output voltage Va.

If the target output voltage Va is not supplied to the motor drive circuit 25, the motor drive apparatus 2 cannot drive the motor 80 satisfactorily. If the required inverter output becomes greater than the limit output Qc when the greatest assist torque is required for rapid steering operation or the like in the electric power steering apparatus 1, the required assist torque cannot be produced and steering operation feeling will be worsened.

SUMMARY OF THE INVENTION

It is therefore an object of the present invention to provide a motor drive apparatus and an electric power steering system, which is capable of suppressing a booster output voltage from falling even in case high power output is required.

According to the present invention, a motor drive apparatus comprises a motor drive circuit for driving a motor, a booster circuit for supplying a booster output voltage by boosting a power source voltage, and a boosting control circuit for controlling the booster circuit. The booster circuit includes a booster coil, an output capacitor and at least two sub-booster circuits connected in series. Each of the sub-booster circuits has two switching elements.

The booster circuit may include at least two sub-booster circuit groups connected in series. Each sub-booster circuit group has the sub-booster circuits connected in parallel. Alternatively, the booster circuit includes at least two sub-booster circuit groups connected in parallel. Each of the sub-booster circuit group has the sub-booster circuits connected in series.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EMBODIMENT

A motor drive apparatus according to the present invention will be described below with reference to plural embodiments, in which the motor drive apparatus is used in an electric power steering system for assisting a steering operation of a vehicle.

(First Embodiment)

Figure 1:
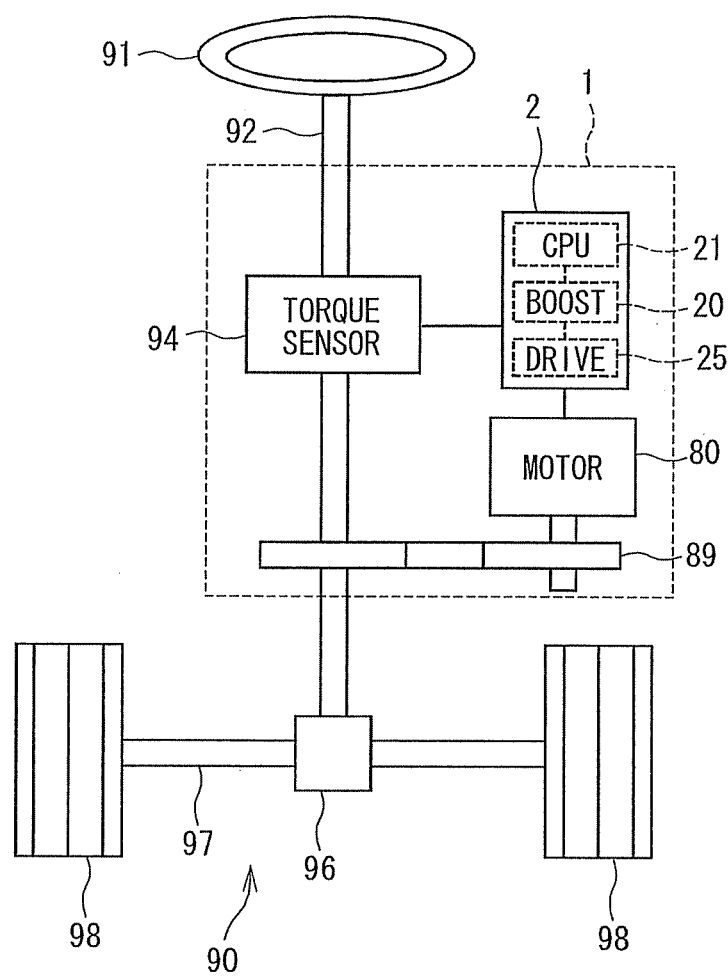
FIG. 1 is a schematic view of an electric power steering system, which uses a motor drive apparatus according to a first embodiment of the present invention.

Referring first to FIG. 1, an electric power steering system 1 is provided in a steering system 90 of a vehicle, and has a torque sensor 94, which detects steering torque, on a steering shaft 92 coupled to a steering wheel 91. A pinion gear 96 is attached to an end of the steering shaft 92. The pinion gear 96 is meshed with a rack shaft 97. A pair of tire wheels 98 is coupled to both ends of the rack shaft 97 rotatably through tie rods and the like.

When a driver turns the steering wheel 91, the steering shaft 92 coupled to the steering wheel 91 rotates. Rotary motion of the steering shaft 92 is converted into linear motion of the rack shaft 97 by the pinion gear 96. The pair of wheels 98 is steered by an angle corresponding to an amount of the linear motion of the rack shaft 97.

The electric power steering system 1 includes an electric motor 80, a reduction gear 89 and a motor drive apparatus 2. The reduction gear 89 operates as a motive power transfer device and transfers rotation of the motor 80 to the steering shaft 92 after reduction of rotation of the motor 80. The motor 80 is a three-phase brushless motor and rotates the reduction gear 89 in both forward and reverse directions. The motor drive apparatus 2 includes a CPU 21, a booster circuit 20 and a motor drive circuit 25 and drives the motor 80 in accordance with the steering torque detected by the torque sensor 94. With this configuration, the electric power steering system 1 generates steering assist torque for assisting steering operation of the steering wheel 91 and transferring the rotation to the steering shaft 92.

Figure 2:
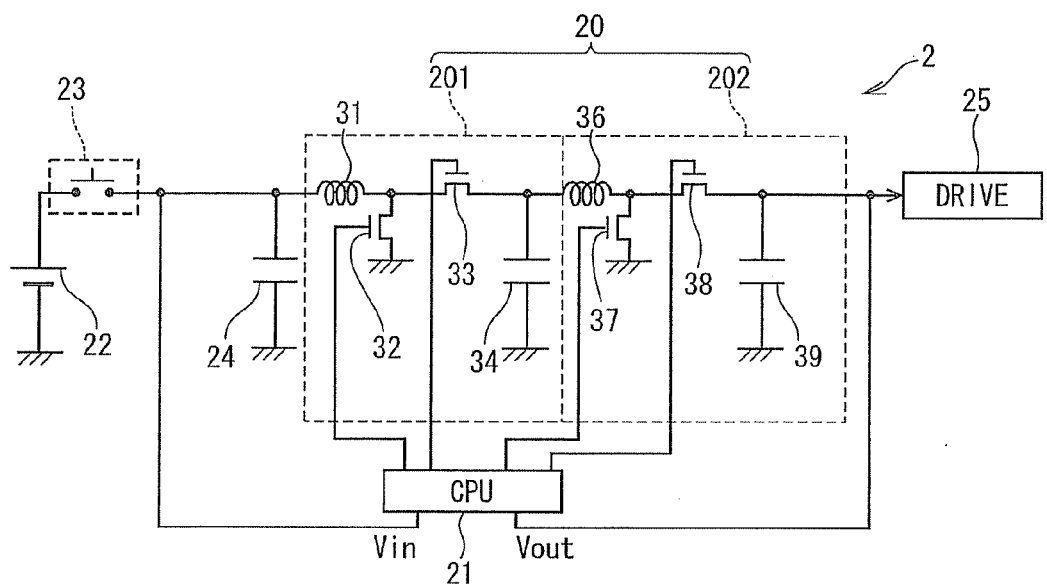
FIG. 2 is a circuit diagram showing a booster circuit in the motor drive apparatus shown in FIG. 1.

As shown in FIG. 2, the motor drive apparatus 2 includes, in addition to the booster circuit 20, the CPU 21 and the motor drive circuit 25, a battery 22, a power supply switch 23, an input capacitor 24. The CPU 21 operates as a boosting control circuit. The CPU 21 receives a feedback of an actual booster output voltage Vout of the booster circuit 20 supplied to the motor drive circuit 25, and feedback-controls the booster output voltage Va by PID (proportional-integral-derivative)

control. The CPU 21 controls on/off operation of switching elements 32, 33, 37, 38 of the booster circuit 20 so that the actual booster output voltage Vout attains the target output voltage Va. Specifically, as described below, it outputs a PWM signal, which indicates a boosting duty and a reducing duty.

The battery 22 is mounted in the vehicle to supply the battery voltage Vin as a power voltage of a power source (battery 22). The power supply switch 23 is connected between the battery 22 and the booster circuit 20. The power supply switch 23 is formed of a relay, for example, and turns on and off supply of the battery voltage Vin to the booster circuit 20. The input capacitor 24 is provided to remove noises of the battery voltage Vin.

The motor drive circuit 25 is provided for driving the motor 80. For example, in case that the motor 80 is a three-phase AC motor, a three-phase inverter circuit is used as the motor drive circuit 25. The booster output voltage Vout is supplied from the booster circuit 20 to the motor drive circuit 25. The booster circuit 20 is formed of a first stage sub-booster circuit 201 and a second stage sub-booster circuit 202, which are connected in series.

Figure 6:
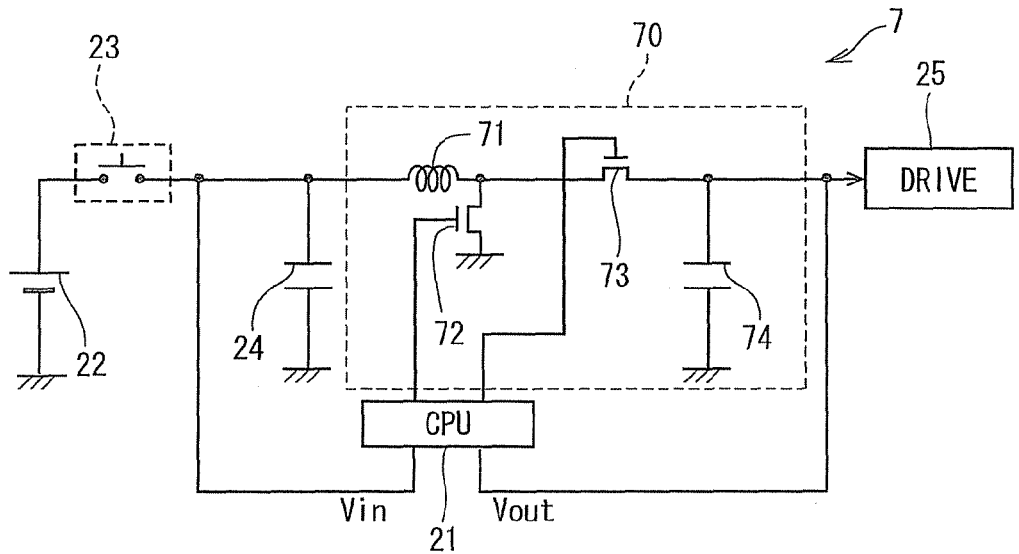
FIG. 6 is a circuit diagram showing a booster circuit of a conventional motor drive apparatus.

Referring back to FIG. 2, the sub-booster circuits 201, 202 are configured similarly as the conventional booster circuit 70 shown in FIG. 6, to which reference may be had. The booster coils 31, 36 correspond to the booster coil 71, the boosting switching elements 32, 37 correspond to the boosting switching element 72, the reducing switching elements 33, 38 correspond to the reducing switching element 73, and output capacitors 34, 39 correspond to the output capacitor 74. The sub-booster circuit 201 boosts the battery voltage Vin of the battery 22 and supplies it to the sub-booster circuit 202. The sub-booster circuit 202 further boosts the booster output voltage of the sub-booster circuit 202 and outputs the booster output voltage Vout to the motor drive circuit 25.

It is assumed here that a boosting duty of the boosting switching element 32 and a reducing duty of the reducing switching element 33 in the sub-booster circuit 201 are D11 and D12, respectively. It is also assumed that a boosting duty of the element 37 and a reducing duty of the reducing switching element 38 in the sub-booster circuit 202 are D21 and D22, respectively. A sub-boosting ratio between the input voltage and the output voltage of the sub-booster circuit 201 is assumed to be $\beta1$ and a sub-boosting ratio between the input voltage and the output voltage of the sub-booster circuit 202 is assumed to be $\beta2$.

The relation among the boosting duties D11, D21, the reducing duties D12, D22 and the sub-boosting ratios $\beta1$, $\beta2$ are expressed by the following equations (2-1), (2-2) and (2-3).

$$V_{out} = V_{in} \times \beta1 \times \beta2 \quad (2\text{-}1)$$

$$\beta1 = (D11 + D12)/(100 - D11) \quad (2\text{-}2)$$

$$\beta2 = (D21 + D22)/(100 - D21) \quad (2\text{-}3)$$

If the boosting duties and the reducing duties of the sub-booster circuit 201 and the sub-booster circuit 202 are set to be equal, that is, D11=D21=D1 and D12=D22=D2, the following equations (3-1) and (3-2) are obtained. Here, $\beta^2$ is a total boosting ratio of the booster circuit 20.

$$V_{out} = V_{in} \times \beta^2 \quad (3\text{-}1)$$

$$\beta = (D1 + D2)/(100 - D1) \quad (3\text{-}2)$$

If the dead time is ignored, the equations (3-1) and (3-2) are expressed as the following equations (3-3) and (3-4), respectively.

$$D1 + D2 = 100 \quad (3\text{-}3)$$

$$\beta = (D1 + D2)/D2 \quad (3\text{-}4)$$

If D1=D2=50%, $\beta=2$ and $\beta^2=4$. That is, the booster circuit 20 produces the booster output voltage Vout (4×Vin), which is four times as large as the battery voltage Vin.

Figure 3:
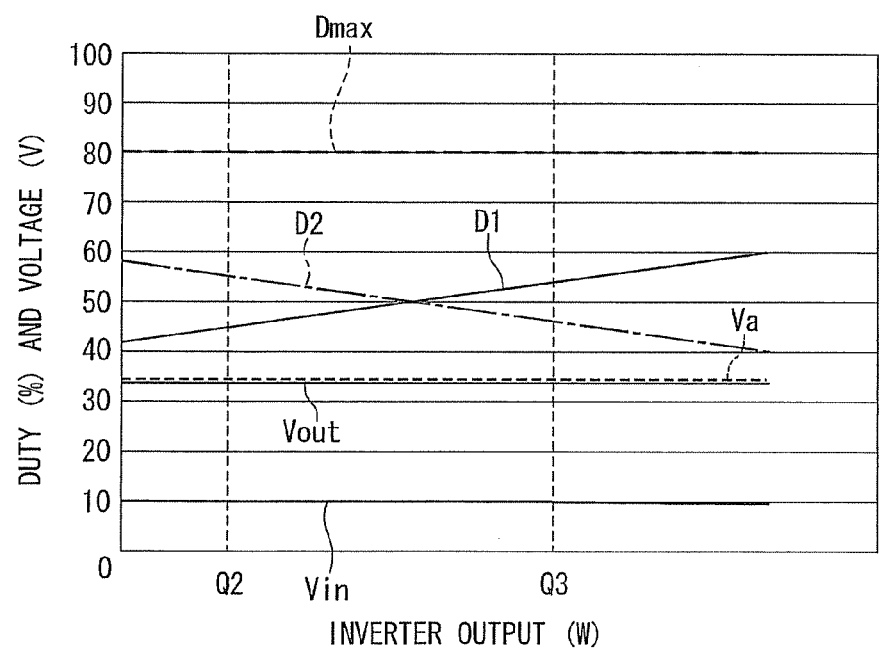
FIG. 3 is a graph showing an output voltage characteristic and a duty characteristic of the booster circuit shown in FIG. 2.
Figure 7:
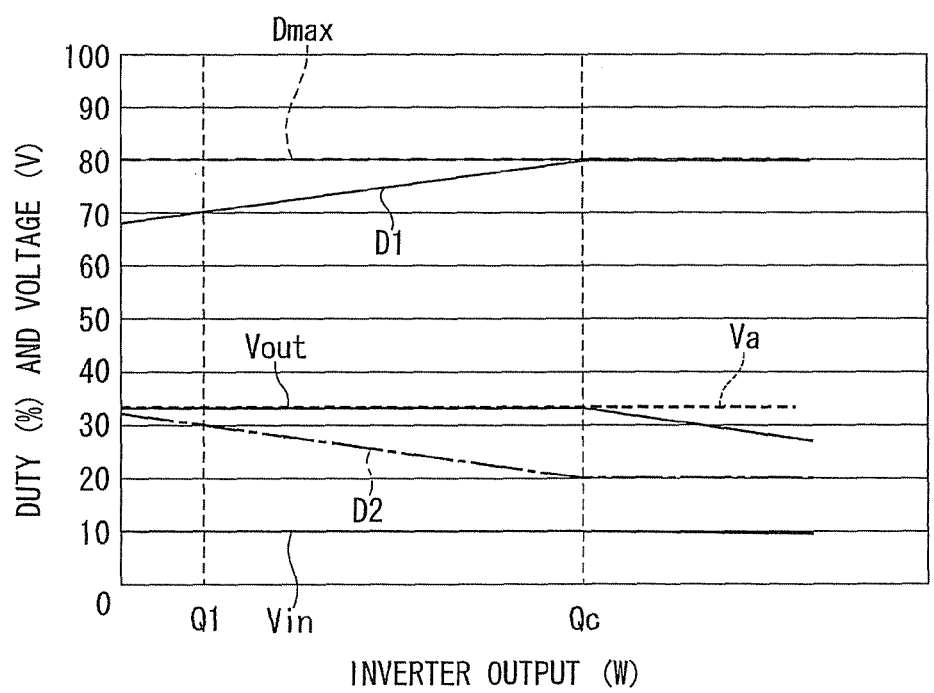
FIG. 7 is a graph showing an output voltage characteristic and a duty characteristic of the booster circuit shown in FIG. 6.

The booster circuit 20 described above exhibits an output voltage characteristic and a duty characteristic as shown in FIG. 3, which is provided in comparison with FIG. 7.

The boosting duty D1 and the reducing duty D2 are assumed to be the same between the sub-booster circuit 201 and the sub-booster circuit 202. As a result, the control is simplified and the CPU 21 is loaded less.

For example, if the inverter output is Q2, the boosting duty D1 is about 45% and the reducing duty D2 is about 55%. As a result, from the equation (3-4), the sub-boosting ratio $\beta$ is about 1.8 and the total boosting ratio $\beta^2$ is about 3.3. Therefore, the booster output voltage Vout becomes about 33V relative to the battery voltage Vin of about 10V. That is, the total boosting ratio corresponds to a square value of the sub-boosting ratio $\beta$. As a result, a similar booster output voltage Vout can be produced with lower boosting ratio in comparison to the conventional booster circuit shown in FIG. 6.

Assuming that the target output voltage Va is fixed at about 33V, the CPU 21 increases the boosting duty D1 in accordance with an increase in the required inverter output as shown in FIG. 3 so that the booster output voltage Vout attains the target output voltage Va. The reducing duty D2 decreases as the boosting duty D1 increases.

The boosting duty D1 does not rise to the saturation duty Dmax at the inverter output Q3, which corresponds to the limit output Qc in FIG. 7. Therefore, it is possible that the booster output voltage Vout attains the target output voltage Va. The booster circuit 20 can thus produce a sufficiently high booster output voltage Vout even when a high power output is required. As a result, it is possible to prevent the booster output voltage Vout from falling relative to the target output voltage Va.

The motor drive apparatus 2 is thus enabled to drive the motor 80 satisfactorily and the electric power steering apparatus 1 can generate assist torque as required even at the time of rapid steering operation time. Further, the electric power steering apparatus 1 is effective when used in a large-sized vehicle, which requires high output power.

(Second Embodiment)

Figure 4A:
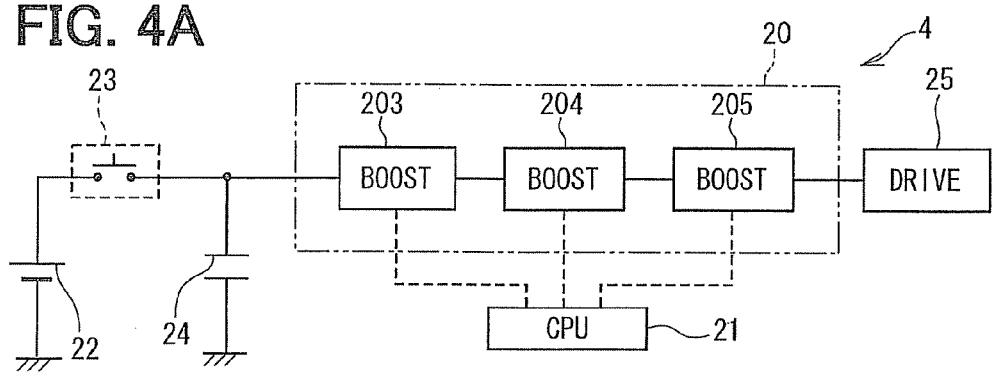
FIGS. 4A, 4B and 4C are circuit diagrams showing booster circuits of motor drive apparatuses according to second to fourth embodiments of the present invention.

According to a second embodiment, as shown in FIG. 4A, the booster circuit 20 includes three sub-booster circuits 203, 204, 205, which are connected in series. It is also possible to connect more than three sub-booster circuits in series. The total boosting ratio of the booster circuit 20 is a product of respective boosting ratios of the sub-booster circuits 203, 204, 205. As a result, the booster output voltage Vout can be boosted more by increasing the number of sub-booster circuits connected in series. Assuming that the boosting ratio of each sub-booster circuit is 2, the total boosting ratio of 2×n can be provided by connecting a n-units of sub-booster circuits in series.

(Third Embodiment)

According to a third embodiment, as shown in FIG. 5B, the booster circuit 20 includes a first stage sub-booster circuit group, in which sub-booster circuits 206, 207 are connected in parallel, and a second stage sub-booster circuit group, in which sub-booster circuits 208, 209 are connected in parallel. The first stage sub-booster circuit group and the second stage sub-booster circuit group are connected in series. By connecting the sub-booster circuits in parallel in each group, loss of current can be reduced so that the booster circuit 20 may be used in large current environment.

(Fourth Embodiment)

Figure 4B:
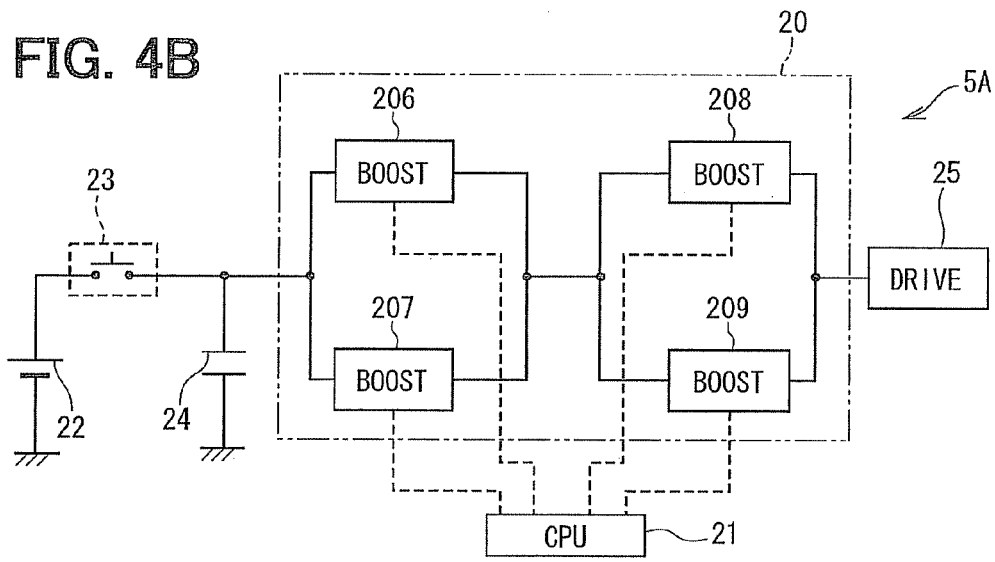
Figure 4C:
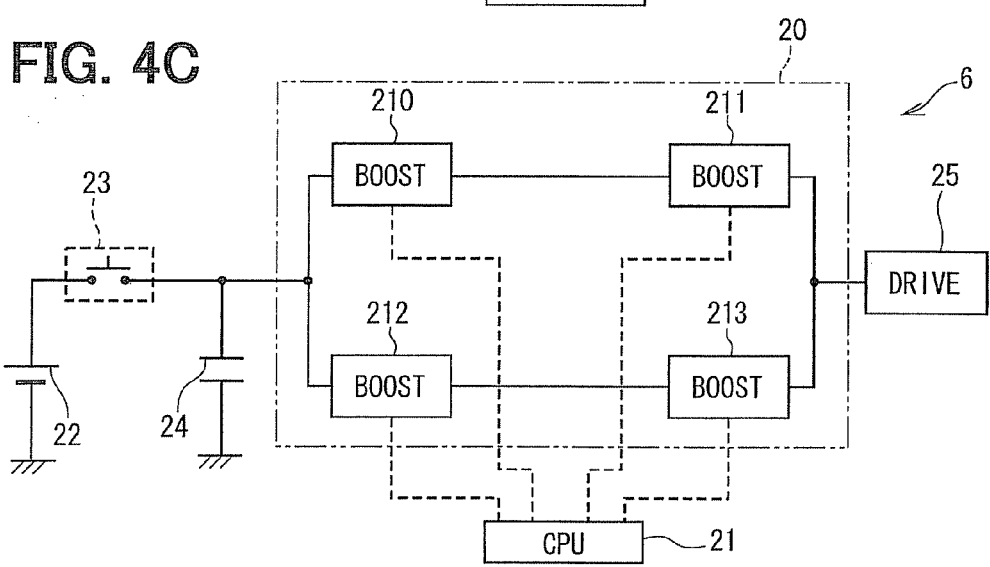

According to a fourth embodiment, as shown in FIG. 4C, the booster circuit 20 includes a third sub-booster circuit group of sub-booster circuits 210, 211, which are connected in series, and a fourth sub-booster circuit group of sub-booster circuits 212, 213, which are also connected in series. The third group of the sub-booster circuits 210, 211 is connected in parallel to the fourth group of the sub-booster circuits 212, 213. Thus, a series connection and a parallel connection of a plurality of sub-booster circuits 210 to 213 can be combined arbitrarily.

(Fifth Embodiment)

Figure 5:
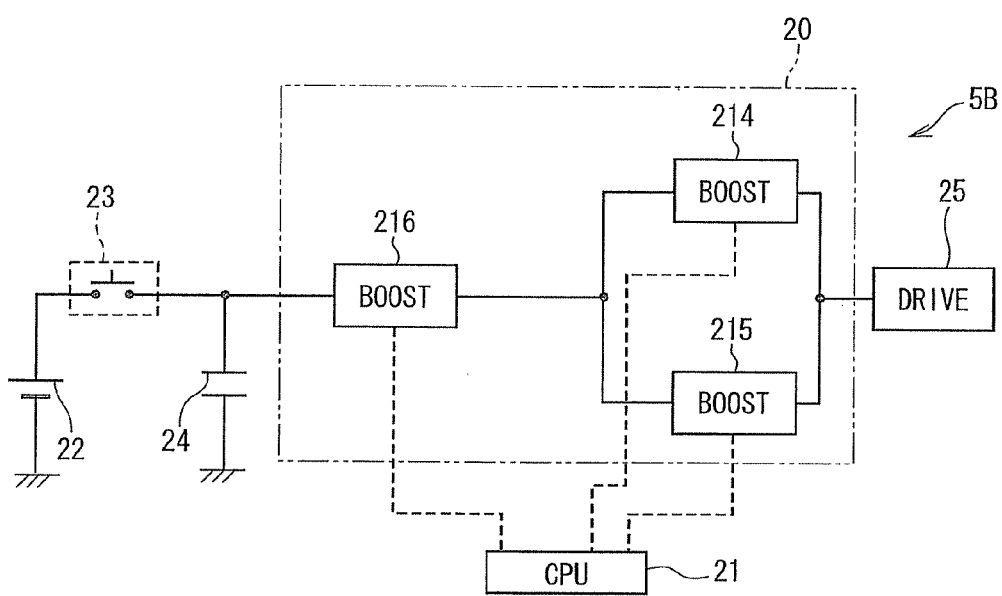
FIG. 5 a circuit diagram showing a booster circuit of a motor drive apparatus according to a fifth embodiment of the present invention.

According to a fifth embodiment, as shown in FIG. 5, the booster circuit 20 includes three sub-booster circuits 214, 215, 216. The sub-booster circuits 214, 215, which corresponds to the second group in FIG. 4B, are connected in parallel to each other and in series with the sub-booster circuit 216. This configuration is effective to reduce the number of circuit parts and costs relative to the booster circuits 20 shown in FIGS. 4B and 4C.

(Other Embodiments)

According to the embodiments described above, the boosting duties D1 and the reducing duties D2 are assumed to be the same among plural sub-booster circuits. However, the boosting duty and the reducing duty may be different among the plural sub-booster circuits. Thus, it is possible to perform a variety of controls in correspondence to surrounding environments. In case of initially checking whether each sub-booster circuit is normal or abnormal before starting a motor drive operation, the sub-booster circuit can be checked based on a duty value.

The CPU 21 may have a function of stopping a switching operation of switching elements in at least one of sub-booster circuit. For example, when a short-circuit failure or a wire breakage failure of a switching element occurs, the switching operation of a sub-booster circuit, which has such a failure, may be stopped upon detection of the failure. As a result, generation of excessive current or erroneous operation can be prevented and reliability of the motor drive apparatus is improved.

Power supply voltage is not limited to the battery voltage Vin but may be other voltages generated by other DC power sources.

The motor drive apparatus 2 may be so configured that the target output voltage Va is set based on a motor rotation angle detected by a rotation angle sensor and/or a vehicle speed detected by a vehicle speed sensor as well as the steering torque detected by the torque sensor 94.

The motor drive apparatus 2 according to the embodiments may be used in a variety of apparatuses such as VGRS (variable gear steering apparatus) and ARS (active rear steering apparatus) other than the electric power steering system.

The present invention is not limited to the disclosed embodiments but may be implemented differently as different embodiments.

What is claimed is:

1. A motor drive apparatus comprising:
   a motor drive circuit for driving a motor;
   a booster circuit for supplying a booster output voltage by boosting a power source voltage; and
   a boosting control circuit for controlling the booster circuit, wherein
   the booster circuit includes a booster coil, an output capacitor and at least two sub-booster circuits connected in series, each of the sub-booster circuits having two switching elements; and
   the boosting control circuit is configured to set a target booster output voltage of the booster circuit, output a duty for turning on and off the switching elements of the sub-booster circuits in accordance with the target output voltage, and set equal duties for the at least two sub-booster circuits.

2. The motor drive apparatus according to claim 1, wherein:
   the boosting control circuit is configured to receive a feedback of a booster output voltage supplied to the motor drive circuit and controls the duty of the switching elements based on the booster output voltage by using at least one of proportional control, integral control and derivative control.

3. A motor drive apparatus comprising:
   a motor drive circuit for driving a motor;
   a booster circuit for supplying a booster output voltage by boosting a power source voltage; and
   a boosting control circuit for controlling the booster circuit, wherein
   the booster circuit includes a booster coil, an output capacitor and at least two sub-booster circuits connected in series, each of the sub-booster circuits having two switching elements; and
   the boosting control circuit is configured to stop a switching operation of the switching elements in at least one of the sub-booster circuits.

4. A motor drive apparatus comprising:
   a motor drive circuit for driving a motor;
   a booster circuit for supplying a booster output voltage by boosting a power source voltage; and
   a boosting control circuit for controlling the booster circuit, wherein
   the booster circuit includes a booster coil, an output capacitor and at least two sub-booster circuits connected in series, each of the sub-booster circuits having two switching elements; and
   the boosting control circuit is configured to set a target booster output voltage of the booster circuit, output a duty for turning on and off the switching elements of the sub-booster circuits in accordance with the target output voltage, and set different duties for the at least two-sub-booster circuits.

* * * * *